United States Patent Office 3,528,909
Patented Sept. 15, 1970

---

3,528,909
CONVERSION OF METALS-CONTAINING HYDROCARBON OILS
Robert J. White, Pinole, Calif., assignor to Chevron Research Company, San Francisco, Calif., a corporation of Delaware
No Drawing. Filed Sept. 25, 1967, Ser. No. 670,443
Int. Cl. C01g 17/00
U.S. Cl. 208—90        2 Claims

ABSTRACT OF THE DISCLOSURE

A process for the conversion of a metals-containing hydrocarbon oil by contacting with hydrogen fluoride to convert the metals to metal fluorides. The metal fluorides and the bulk of the unconverted hydrogen fluoride are separated from the oil. The oil is then defluorinated by contacting it with hydrogen in the presence of a catalyst comprising 5–30 weight percent of at least one group VI metal on a predominantly alumina support. The defluorinated oil is then hydrocracked with a silica containing hydrocracking catalyst.

BACKGROUND OF THE INVENTION

This process relates to the catalytic conversion of hydrocarbon oils and, more particularly, to methods for the prevention of collapse and fouling of siliceous catalysts used in such conversions.

Fluorine, being a highly reactive element, combines readily with silica to form numerous fluosilicate compounds, most of which are quite volatile. Consequently, when fluorine is contacted with a siliceous catalyst, the fluorine reacts with the silica and strips it out of the catalyst structure. In catalysts where the silica comprises a substantial portion of the catalyst support, this removal of the silica causes the catalyst structure to collapse, decreasing the catalyst surface area and resulting in a deactivated catalyst. The volatile fluosilicates formed migrate throughout the catalyst bed and the reactor vessel and tend to condense and solidify in the cooler portions thereof, thus forming plugs which disrupt and decrease the flow of hydrocarbon oils through the catalyst bed and reactor vessel.

Table I illustrates the deleterious effect fluorine in the feed has on siliceous catalysts. In each case, the feed yield was deasphalted oil, which had been produced at a yield of 55–80 percent from a conventional solvent deasphalting unit. This feed was hydrocracked at 800° F., 2400 p.s.i.g., and 1 LHSV over a nickel-tungsten hydrocracking catalyst supported on a silica-alumina carrier containing 39 percent silica.

TABLE I

| Run | Fluorine present? | Hours on stream before reactor plugged |
|---|---|---|
| A | No | >100 |
| B | No | >100 |
| C | Yes | 70 |
| D | Yes | 60 |
| E | Yes | 40 |
| F | No | >200 |
| G | Yes | 40 |

In each case where fluorine was not present, the test run was halted after the hours indicated. No evidence of silicate plugging was detected. In contrast, in each of the test runs in which fluorine was present, the reaction vessel became plugged rapidly. During the latter runs the product quality declined continuously as the plugs developed. It is therefore imperative that any fluorine present in the feed to a catalytic process employing a siliceous catalyst be removed before the feed contacts the siliceous catalyst.

Substantial research has heretofore been done on fluorine removal from light products of HF alkylation processes. Many materials were found satisfactory for removal of fluorine from these light products; among these were activated alumina, bauxite, and iron group metals. Typical disclosures of fluorine removal from alkylates may be found in U.S. Pats. 2,347,945 and 2,481,208.

It has now been discovered that when heavy oils, such as deasphalted oils or residua, are contaminated by fluorine, the problem of fluorine removal is substantially different from and greater than that encountered by those researchers who studied fluorine removal from light materials such as alkylate. When heavy oils are involved, the materials disclosed in the prior art do not do an effective job of fluorine removal, and are not the equivalent of the catalysts used in the process of this invention.

SUMMARY OF THE INVENTION

The process of this invention is a process for converting a fluorine-containing heavy hydrocarbon oil which comprises contacting said oil in a defluorination zone in the presence of hydrogen with a defluorination catalyst comprising 5–30 weight percent of at least one Group VI metal disposed on an essentially nonsiliceous support, and thereafter contacting the effluent of said defluorination zone with a siliceous catalyst in a conversion zone at suitable conditions to produce the desired fluorine-free products.

In various preferred embodiments, the Group VI metal is selected from the group consisting of molybdenum and tungsten, one or more Group VIII metals are included in the catalyst, an HF demetalation steps precedes the basic process of this invention, and/or the Group VI metal content of the catalyst is in the range of 15–30 weight percent. A particularly preferred catalyst is one containing 5–30 weight percent molybdenum and 4–10 weight percent nickel disposed on alumina.

DETAILED DESCRIPTION OF THE INVENTION

The present invention is based upon the discovery that when heavy oils are contaminated with fluorine the fluorine content of the oil can be reduced to insignificant levels only by contacting the oil in the presence of hydrogen with a catalyst comprising 5–30 weight percent of at least one Group VI metal disposed on an essentially nonsiliceous support. The fluorine removal procedures disclosed in the prior art, principally alumina treating, are not capable of producing the unexpectedly high degree of defluorination obtained in the present process. It has been found that there is a significant and harmful residual amount of fluorine left in fluorine-contaminated oils after treating by the conventional methods disclosed in the prior art. With the process of this invention, it is possible to decrease the amount of this "residual fluorine" by an order of magnitude. For instance, a typical 12° API gravity deasphalted oil, containing 60 p.p.m. of fluorine, has been contacted with hydrogen in the presence of the preferred nickel-molybdenum-alumina catalyst at 804° F., 2300 p.s.i.g., and 4.8 LHSV and defluorinated to <1 p.p.m. fluorine. Under substantially identical conditions, however, repeated runs using only alumina failed to reduce the fluorine level to below 10 p.p.m. Only oils having a fluorine content on the order of 1 p.p.m. or less can be satisfactorily converted by a siliceous catalyst. Consequently, the process of this invention is a process for converting a fluorine-containing heavy hydrocarbon oil which comprises contacting said oil in a defluorination zone in the presence of hydrogen with a catalyst comprising 5–30 weight percent of at least one Group VI metal disposed on an essentially nonsiliceous support, and thereafter contacting the effluent of this defluorination zone under suitable conditions to produce the desired fluorine-free products. Typical conversion processes employing siliceous catalysts which may be combined with defluorination in the process of this invention are hydrocracking, hydrogenation and isomerization.

Most commonly, the process of this invention would be preceded by an HF demetalation step such as that described in U.S. Pat 3,203,892. In such a step, a metals-containing hydrocarbon oil is contacted with HF in liquid or vapor form; the metals in the oil, usually present as organo-metallic porphyrins, are converted to insoluble metal fluorides; and the metal fluorides and the bulk of the untreated HF are separated from the hydrocarbon oil. In such a process, however, it is very difficult to remove all the fluorine from the oil. Some of the HF reacts with the oil to form organic fluorides, while a small portion of the HF remains dissolved in the oil because of the small degree of inefficiency inherent in conventional HF separation units. Consequently, such oil is not suitable for further catalytic processing with siliceous catalysts for the reasons noted above. However, if the oil is subjected to the process of this invention after HF demetalation, satisfactory results may be obtained from siliceous catalyst processing.

The feedstocks which may be used in the process of this invention are any fluorine-containing heavy hydrocarbon oils that are desirably converted to other materials by catalytic processing with a siliceous catalyst. Such oils may include, but are not limited to, crude oils, shale oils, residual oils, deasphalted oils, topped crude oils, heavy distillate oil fractions, and cracked stocks. The feed may in some cases contain contaminants, such as nitrogen and sulfur, if such can be tolerated by the siliceous catalyst to be used.

The catalysts used in the defluorination step are essentially nonsiliceous catalysts comprising 5–30 weight percent of at least one Group VI metal. Preferred Group VI metals are molybdenum and tungsten. Group VIII metals may also be on the catalyst, generally in smaller amounts than the Group VI metal or metals. Preferred Group VIII metals are the iron group, particularly cobalt and nickel. Particularly active catalysts preferred for use in the process of this invention have nickel contents in the range 4–10 percent by weight and molybdenum contents in the range 5–30 percent by weight. The catalysts are conveniently prepared by impregnating an alumina support with nickel and molybdenum compounds convertible to the oxides by calcination to give the finished catalyst the desired metals content, calcining, and then sulfiding to convert the nickel and molybdenum oxides predominantly to the sulfides. The metals may be impregnated into the catalyst in the order of molybdenum first, followed by nickel, although the reverse order is preferred, since the molybdenum has a tendency to leach out of the catalyst during the nickel impregnation. A detailed description of preparation of this preferred type of catalyst will be found in U.S. Pat. 3,114,701 to R. L. Jacobson and R. H. Kozlowski.

The preferred catalyst support is substantially a microporous alumina, such as is commercially available or may be prepared by well-known methods. Highly active catalysts have also been prepared by impregnating a coprecipitated molybdenum oxide-alumina carrier with additional molybdenum to provide metal concentrations in the required range; i.e., above 5 percent molybdenum. Other conventional nonsiliceous supports, such as cobalt-molybdenum and alumina-magnesia, can be used. The inclusion of minor amounts of zinc, copper, or similar metals does not materially affect the unexpectedly high degree of defluorination obtained with these catalysts, but neither do they aid in the process and they are preferably excluded. In general, the support should be predominantly alumina. For the reasons discussed above, silica should be excluded from the catalyst support, although a slight amount may be present without harmful effects if the fluorine content of the feed is low and if the percentage of silica in the catalyst is kept below 1 weight percent. Where the catalyst is to be employed in a fixed bed process, the support is usually preformed, as in the shape of small spheres, pellets, rods, or irregular pieces, and thereafter impregnated with the desired amount of metal or metals by conventional methods. A typical method is described in aforesaid U.S. Pat. 3,114,701.

The defluorination step of the process of this invention is operated at a temperature in the range of 550°–900° F., a pressure from 500 p.s.i.g. to 5000 p.s.i.g. or greater, and preferably within the range 1000–4000 p.s.i.g., an LHSV of 0.2–50 volumes of feed per volume of catalyst, and a hydrogen throughput rate of 500–25,000 s.c.f./bbl. of feed. In a preferred mode of operation, the defluorination zone and the conversion zone share the same reaction vessel. In this preferred mode, the zones are arranged, of course, such that the feed contacts the defluorination zone before it contacts the conversion zone. A typical arrangement would be as successive catalyst layers.

The fluorine content of the feed may range from a few parts per million (p.p.m.) up to several thousand p.p.m. Table II shows the fluorine removal accomplished by the catalyst used in the defluorination zone of the process of this invention. In each case, the feed was a 12° API deasphalted oil containing 60 p.p.m. of fluorine.

TABLE II

| Run | Temp., °F. | LHSV | Pressure, p.s.i.g. | Hydrogen rate, s.c.f./b. | Fluorine in Product, p.p.m. | Fluorine removal, percent |
|---|---|---|---|---|---|---|
| H | 801 | 1.0 | 2,200 | 5,000 | <1.0 | >98 |
| I | 805 | 9.6 | 2,400 | 5,000 | 1.2 | 98 |
| J | 795 | 32.0 | 2,400 | 1,500 | 5.0 | 92 |
| K | 804 | 1.0 | 2,300 | 5,000 | <1.0 | >98 |
| L | 807 | 9.6 | 1,200 | 5,000 | 1.7 | 97 |
| M | 601 | 3.2 | 1,200 | 5,000 | 8.0 | 87 |
| N | 408 | 1.0 | 1,200 | 3,300 | 31.0 | 48 |
| O | 410 | 1.0 | 400 | 4,500 | 34.0 | 43 |
| P | 600 | 1.0 | 1,200 | 6,600 | 7.0 | 88 |
| Q | 802 | 4.8 | 2,400 | 3,500 | <1.0 | >98 |
| R | 800 | 4.8 | 1,000 | 4,200 | <1.0 | >98 |

It will be seen from Table II that the higher temperatures, pressures, and hydrogen rates are desirable, although lower space velocities should be used. However, as Table II illustrates, various combinations of these conditions can be used and satisfactory results will be obtained.

Although many types of catalytic conversion processes may comprise the conversion zone, a preferred process is hydrocracking with a siliceous catalyst. The usual hydrocracking zone operating conditions comprise from about 2000–30,000 s.c.f. hydrogen/bbl. of total feed and, preferably, from about 2000–15,000 at an LHSV of from about 0.2–15 and, preferably, from about 0.4–3.0 at a pressure of at least 1000 p.s.i.g. and, preferably, from about 1000–3000 p.s.i.g. and a temperature in the range of from about 400°–950° F. The preferred initial onstream temperature is from about 500°– 650° F., with progressive increase to about 750°–950° F. so as to maintain catalyst activity at a controlled level.

The siliceous catalyst employed in the hydrocracking zone is one wherein a material having a hydrogenating-dehydrogenating activity is deposited or otherwise combined with a catalyst support. The cracking component may comprise any one or more materials, such as silica, silica-alumina, silica-magnesia, silica-alumina-zirconia, and the like. The hydrogenating-dehydrogenating component of the catalyst can be selected from any one or more of the various Groups VI and VIII metals, as well as the oxides and sulfides thereof, alone or together with promoters and stabilizers that may have, by themselves, negligible catalytic effect. Examples of suitable hydrogenating-dehydrogenating components are the oxides and sulfides of molybdenum, tungsten, chromium, and the like as well as metals, such as iron, nickel, cobalt and platinum. More than one hydrogenating-dehydrogenating component may be present, and favorable results may be obtained with catalysts containing composites of two or more of the oxides of molybdenum, cobalt, chromium, tungsten, nickel, tin and zinc, and with mixtures of said oxides with fluorine. The amount of the hydrogenating-dehydrogenating component can be varied within wide limits from about 0.5–30 percent based on the weight of the entire catalyst.

The above-described examples are given for illustrative purposes only. It is apparent that many widely different embodiments of this invention may be made without departing from the scope and spirit thereof; and, therefore, it is not intended to be limited except as indicated in the appended claims.

I claim:
1. A process for converting a metals-containing heavy hydrocarbon oil to a more valuable hydrocarbon product, which comprises:
   (a) contacting the metals-containing heavy hydrocarbon oil with hydrogen fluoride to thereby convert said metals to metal fluorides;
   (b) separating the metal fluorides and the bulk of unconverted hydrogen fluoride from the oil to thereby obtain a hydrogen fluoride-treated oil;
   (c) contacting the hydrogen fluoride-treated oil with a catalyst comprising 5–30 weight percent of at least one Group VI metal, disposed on a predominantly alumina support to thereby obtain a defluorinated oil; and
   (d) hydrocracking the defluorinated oil with a silica-containing hydrocracking catalyst.

2. A process for converting a metals-containing heavy hydrocarbon oil to a more valuable hydrocarbon product which comprises:
   (a) contacting the metals-containing heavy hydrocarbon oil with hydrogen fluoride in a treating zone under reaction conditions including a temperature between 550°–900° F., a pressure in the range of 500–5000 p.s.i.g., an LHSV of 0.2–50, and a hydrogen throughput rate of 500–25,000 s.c.f. per barrel of feed, to thereby convert said metals to metal fluorides;
   (b) separating the metal fluorides and the bulk of unconverted hydrogen fluoride from the oil to thereby obtain a hydrogen fluoride-treated oil;
   (c) contacting the hydrogen fluoride-treated oil with a sulfided nickel-molybdenum-alumina catalyst containing 4–10 weight percent nickel and 5–30 weight percent molybdenum to thereby obtain a defluorinated oil; and
   (d) hydrocracking the defluorinated oil with a silica-containing hydrocracking catalyst.

References Cited

UNITED STATES PATENTS

| | | | |
|---|---|---|---|
| 2,347,945 | 5/1942 | Frey | 260—683.42 |
| 2,474,032 | 6/1949 | Byrns | 208—262 |
| 2,477,038 | 7/1949 | Bloch | 260—677 |
| 2,739,132 | 3/1956 | Riedl | 252—439 |
| 2,954,339 | 9/1960 | Beavon | 208—262 |
| 2,967,819 | 1/1961 | Leum et al. | 208—262 |
| 3,114,701 | 12/1963 | Jacobson et al. | 252—470 |
| 3,203,892 | 8/1965 | Kimberlin et al. | 208—252 |
| 3,305,477 | 2/1967 | Peck et al. | 208—89 |

DELBERT E. GANTZ, Primary Examiner

T. H. YOUNG, Assistant Examiner

U.S. Cl. X.R.
208—251, 262

PO-1050
(5/69)

UNITED STATES PATENT OFFICE
CERTIFICATE OF CORRECTION

Patent No. 3,528,909      Dated September 15, 1970

Inventor(s) ROBERT J. WHITE

It is certified that error appears in the above-identified patent and that said Letters Patent are hereby corrected as shown below:

Col. 1, lines 47-48, "feed yield was deasphalted oil" should read --feed was a deasphalted oil--

Col. 3, line 15, "untreated HF" should read --unreacted HF--

Signed and sealed this 6th day of July 1971.

(SEAL)
Attest:

EDWARD M. FLETCHER, JR.
Attesting Officer

WILLIAM E. SCHUYLER, JR.
Commissioner of Patents